US011461367B2

(12) United States Patent
You et al.

(10) Patent No.: US 11,461,367 B2
(45) Date of Patent: Oct. 4, 2022

(54) MULTI-SOURCE DATA MANAGEMENT MECHANISM AND PLATFORM

(71) Applicant: Singapore University Of Technology And Design, Singapore (SG)

(72) Inventors: Linlin You, Singapore (SG); Bige Tuncer, Singapore (SG); Chau Yuen, Singapore (SG)

(73) Assignee: SINGAPORE UNIVERSITY OF TECHNOLOGY AND DESIGN, Singapore (SG)

(*) Notice: Subject to any disclaimer, the term of this patent is extended or adjusted under 35 U.S.C. 154(b) by 190 days.

(21) Appl. No.: 16/846,863

(22) Filed: Apr. 13, 2020

(65) Prior Publication Data

US 2021/0319043 A1    Oct. 14, 2021

(51) Int. Cl.
| | | |
|---|---|---|
| *G06F 17/00* | (2019.01) | |
| *G06F 16/28* | (2019.01) | |
| *G06F 16/25* | (2019.01) | |
| *G06F 16/2458* | (2019.01) | |

(52) U.S. Cl.
CPC ........ G06F 16/283 (2019.01); G06F 16/2465 (2019.01); G06F 16/254 (2019.01)

(58) Field of Classification Search
CPC ........ G06F 16/13; G06F 16/24; G06F 16/156; G06F 16/283; G06N 3/00; G06N 5/00; G05B 13/00
See application file for complete search history.

(56) References Cited

U.S. PATENT DOCUMENTS

| | | | | |
|---|---|---|---|---|
| 2007/0233644 | A1* | 10/2007 | Bakalash | .......... G06F 16/24539 |
| 2019/0259470 | A1* | 8/2019 | Olafson | .................. G16B 50/10 |

OTHER PUBLICATIONS

Zhang et al, "An Online-Offline Combined Big Data Mining Platform", 2017.*

* cited by examiner

*Primary Examiner* — Hung D Le
(74) *Attorney, Agent, or Firm* — Casimir Jones SC; Tyler Sisk

(57) ABSTRACT

Platforms and mechanisms for multi-source data management are provided. In accordance with one aspect, a knowledge mining engine comprising an on-line knowledge mining component supporting multi-dimensional queries for on-line knowledge mining of multi-source data and an off-line knowledge mining component for running knowledge mining procedures for off-line knowledge mining of the multi-source data. The multi-source data management platform/mechanism may also include an adaptive data collector to collect data actively and passively, a data analysis cascade to cleanse and analyse the multi-source data concurrently and separately, a data integration cascade to consolidate and integrate the multi-source data according to multiple data integration dimensions, a centralized data repository implementing RESTful APIs for data CRUD operations and storing multi-source data generated in the platform, and a data sharing portal to share data and mined knowledge to users and up-layer applications.

19 Claims, 10 Drawing Sheets

```
                ┌─972                          ┌─974
    ┌───────────┴────────────────────────────┬─┴──────────────┐
    │ GET ▽ │ ServerURL    ─╱─ Query Node URL + Query Method │ Send │ Save │
    ├───────┴────────────────────────────────────────────────────────┤
    │ 1  {                                       ─╱─ Query Parameters│
    │ 2      "APIName": "/userList",                                 │
    │ 3      "Method": "GET",                                        │
    │ 4      "Paramas": [                                            │
    │ 5  }                                                           │
    ├────────────────────────────────────────────────────────────────┤
    │ 1  {                                                           │
    │ 2      "Description": "Service for administrator",             │
    │ 3      {                                                       │
    │ 4                                                              │
    │ 5      "QueryNode": "User",                                    │
    │ 6      "Description": "Service for administrator",             │
    │ 7      {                                                       │
    │ 8          "APIName": "/userList",                             │
    │ 9          "Method": "GET",                                    │
    │10          "Paramas": [                                        │
    │11          {                                                   │
    │12              "username" : "string",                          │
    │13              "reset": "boolean(optional)",                   │
    │14          {                                                   │
    │15          }                                                   │
    │16          "Example": [                    Results:  976       │
    │17          {                               Retrieved           │
    │18              "username": "yll",        ─╱─ Data in JSON      │
    │19              "reset" : true,                                 │
    │20              "privileges": {                                 │
    │21                  "sensor": true,                             │
    │22                  "app": true                                 │
    │23          }                                                   │
    │24      }                                                       │
    │25      "QueryNode": "User",                                    │
    │26      "Description": "Service for administrator",             │
    │27      {                                                       │
    │28          "APIName": "/userList",                             │
    │29          "Method": "GET",                                    │
    │30          "Paramas": [                                        │
    │31          {                                                   │
    │32              "username" : "string",                          │
    │33              "reset": "boolean(optional)",                   │
    │34          {                                                   │
    │35          }                                                   │
    │36          "Example": [                                        │
    │37          {                                                   │
    └────────────────────────────────────────────────────────────────┘
                                960
```

FIG. 9C

MULTI-SOURCE DATA MANAGEMENT MECHANISM AND PLATFORM

TECHNICAL FIELD

The present invention generally relates to data management, and more particularly relates to a multi-source data management mechanism and platform.

BACKGROUND OF THE DISCLOSURE

With the rapid development of information and communication technology (ICT), diverse objects are connected to start upload of their unique data. And in the age of big data, tremendous data is generated through various sources. Such multi-source data (i.e., data generated from multiple objects) needs to be properly managed to improve efficiency and effectiveness of an application domain in Smart Cities, e.g., urban mobility, urban planning. However, most current data management systems only address issues related to big data storage and processing based on distributed computing technologies, instead of solving critical issues such as how to collect, integrate, analyze, mine and share multi-source data.

For example, in order to implement a knowledge-based and responsive urban design, data from various sources are required to support the analysis of place utilization patterns and people mobility patterns, which are keys to disclose place design contexts for designers to draw rational development plans. However, as required data are generated from different objects (e.g., sensors, social networks, mobile applications, mobile networks) and how to consistently and uniformly collect, analyze, integrate, mine, store and share these multi-source data becomes a challenging issue. And this issue is not limited to such cases discussed—they are also widely discussed in other application domains.

Thus, there is a need for a multi-source data management mechanism to efficiently and effectively collect, analyze, integrate, mine, store and share data generated from multiple objects. Furthermore, other desirable features and characteristics will become apparent from the subsequent detailed description and the appended claims, taken in conjunction with the accompanying drawings and this background of the disclosure.

SUMMARY

According to at least one aspect of the present embodiments, a multi-source data management platform is provided. The multi-source data management platform includes a knowledge mining engine comprising an on-line knowledge mining component supporting multi-dimensional queries for on-line knowledge mining of multi-source data and an off-line knowledge mining component for running knowledge mining procedures for off-line knowledge mining of the multi-source data.

According to another aspect of the present embodiments, a method for multi-source data management is provided. The method includes collecting data from multiple sources, cleansing and analysing the multi-source data concurrently and separately, and on-line knowledge mining of multi-dimensional queries applied to the integrated multi-source data to obtain knowledge mined data. The method further includes off-line knowledge mining of the multi-dimensional queries applied to the integrated multi-source data to obtain additional knowledge mined data and storing the multi-source data, including the integrate multi-source data, and the knowledge mined data.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with present embodiments.

FIG. 9, comprising FIGS. 9A, 9B and 9C, depicts illustrations of exemplary user interfaces of a data sharing portal of the multi-source data management platform of FIG. 8 in accordance with the present embodiments for end users to access data managed by the platform, where FIG. 9A depicts a user interface to retrieve full list of query nodes and their supported API methods, FIG. 9B depicts a user interface to retrieve data in a collection of a given query node, and FIG. 9C depicts a user interface to retrieve data in a collection of a given query node by executing a defined query.

Skilled artisans will appreciate that elements in the figures are illustrated for simplicity and clarity and have not necessarily been depicted to scale.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. It is the intent of present embodiments to present a multi-source data management mechanism and a platform implementing the mechanism to manage multi-source data generated from sensors, mobile applications, surveys and workshops, social networks and mobile networks. The multi-source data management platform includes an adaptive data collector to collect data from five sources actively and passively; a data analysis cascade to cleanse and analyse multi-source data concurrently and separately; a data integration cascade to consolidate and integrate multi-source data according to place, people and time data integration dimensions comprehensively; a knowledge mining engine to support multi-dimensional queries for on-line knowledge mining, and to run delicate knowledge mining procedures for off-line knowledge mining; a centralized data repository implementing RESTful APIs for data CRUD operations and storing multi-source data generated in the platform; and finally a data sharing portal to share data and mined knowledge to users and up-layer applications.

Figure 1:
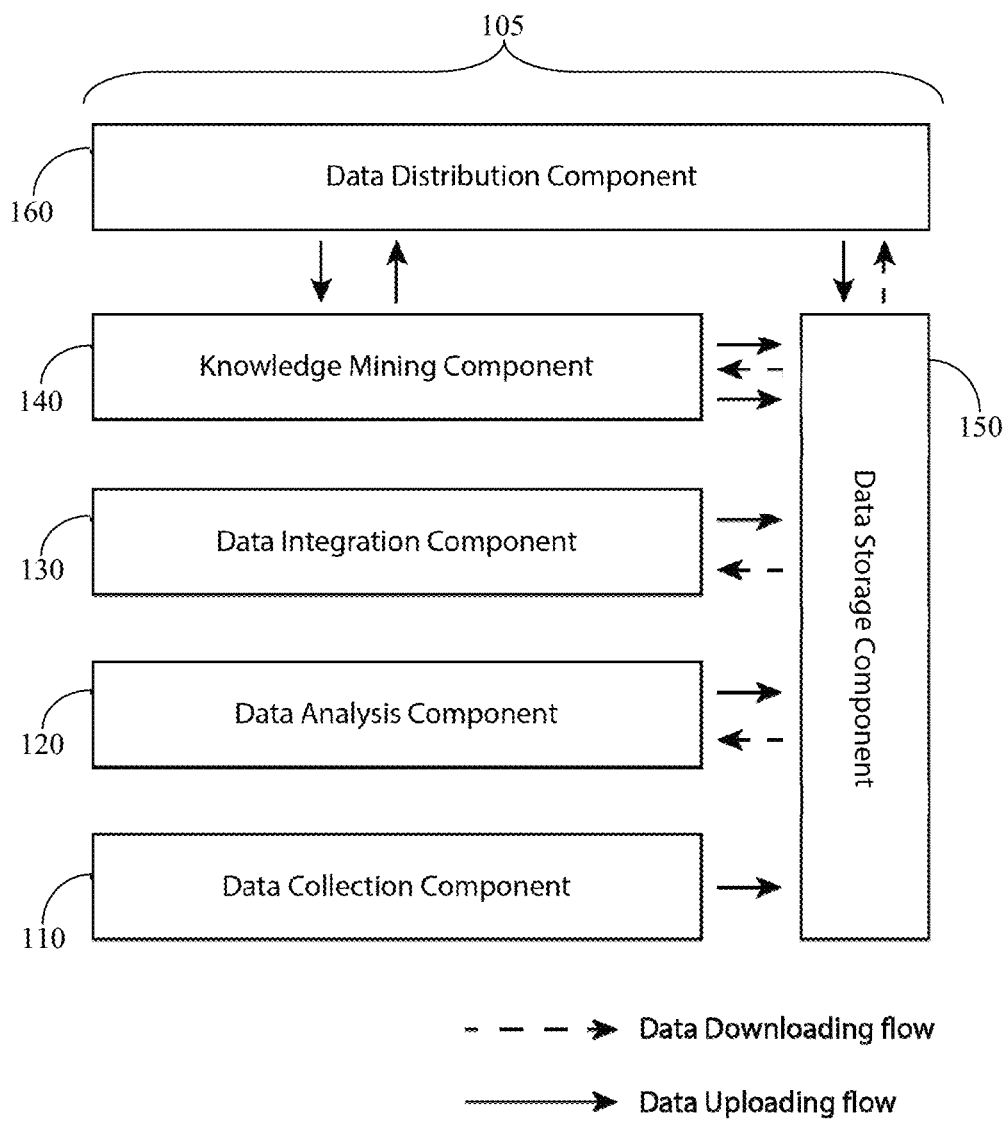
FIG. 1 depicts a block diagram illustrating an overall architecture of a multi-source data management mechanism in accordance with present embodiments.

Referring to the block diagram 100 of FIG. 1, an overall architecture of the multi-source data management mechanism 105 in accordance with present embodiments includes at least six (6) components: a data collection component 110 to collect raw data from multiple sources; a data analysis component 120 to cleanse and analyze the raw data and generate therefrom analyzed data; a data integration component 130 to consolidate and integrate analyzed multi-source data for a consistent and unified data network linked through data integration dimensions; a knowledge mining component 140 to mine knowledge from the analyzed data; a data storage component 150 support create, read, update and delete (CRUD) operations for four (4) kinds of data—raw data, analyzed data, integrated data, and mined knowledge; and a data distribution component 160 to share multi-source data generated in different phases.

Figure 2:
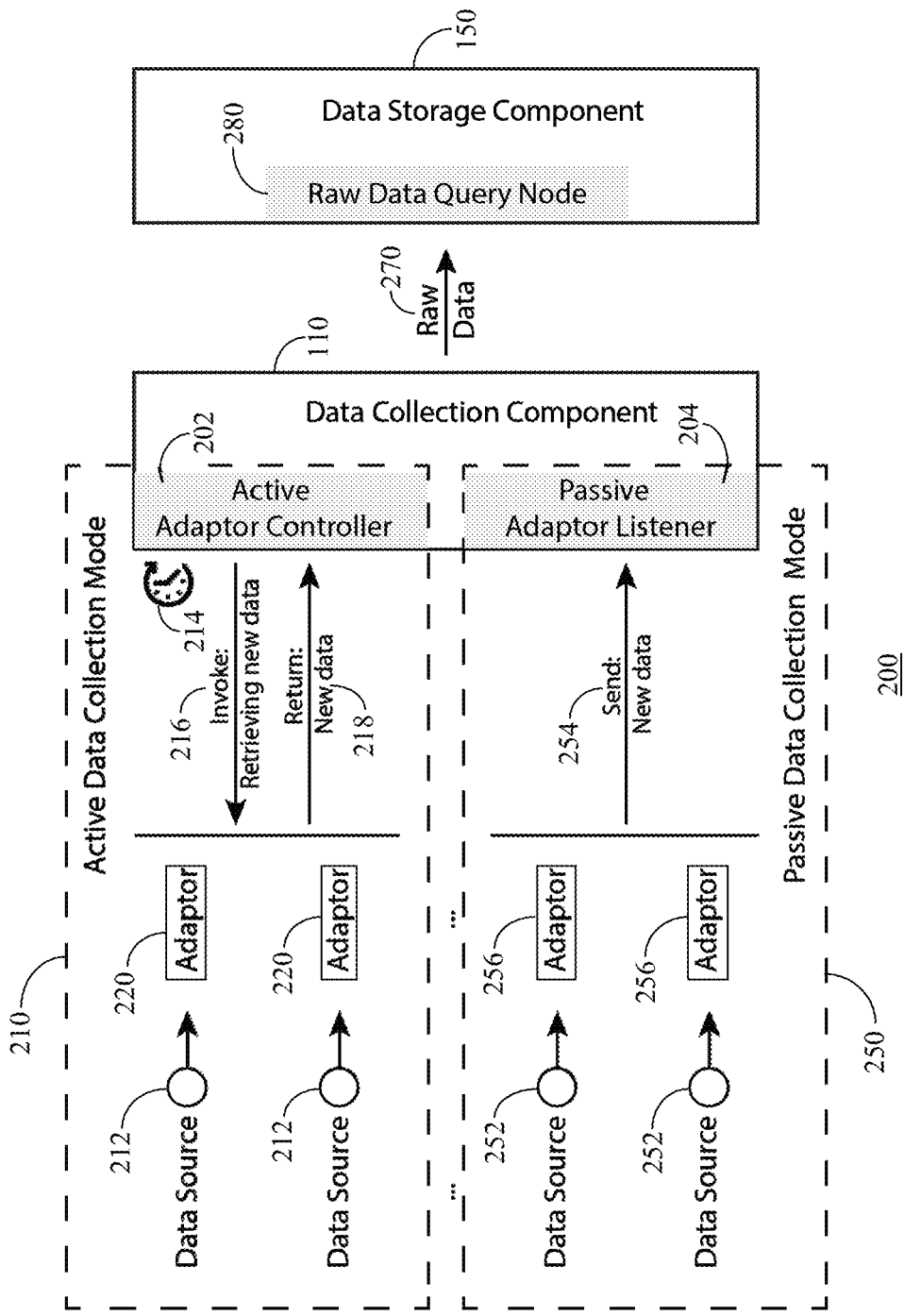
FIG. 2 depicts a schematic illustration of two (2) data collection modes managed by the Data Collection Component of the multi-source data management mechanism of FIG. 1 in accordance with the present embodiments.

The data collection component 110 encapsulates specific data access methods of data sources in common data access interfaces, typically referred to as adaptors, which are used to gather multi-source data adaptively and uniformly. Referring to FIG. 2, a schematic illustration 200 depicts a first data collection mode 210 and a second data collection mode 250 managed by the data collection component 110 in accordance with the present embodiments. The first data collection mode 210 is an active data collection mode and the data collection component 110 includes an active adaptor controller 202 for active data gathering from data sources 212 in the first data collection mode 210. The second data collection mode 250 is a passive data collection mode and the data collection component 110 includes a passive adaptor listener 204 for passive data gathering from data sources 252 in the second data collection mode 250.

The first data collection mode 210 also includes a timer 214 which defines an execution frequency for data collection, two processes 216, 218 and a data uploading flow 270. The two processes are an Invoke Adaptors process 216 and a Return Newly Generated Data process 218. When the timer 214 triggers the active adaptor controller 202 to invoke registered active adaptors 220 by the Invoke Adaptors process 216, the invoked adaptors 220 retrieve newly generated data from the data sources 212 and sends the raw data to the active adaptor controller 202 via the Return Newly Generated Data process 218. After receiving the raw data, the active adaptor controller 202 uploads the retrieved raw data to the data storage component 150 through the data uploading flow 270 and the data storage component 150 stores the data in its sub-component, a raw data query node 280.

The second data collection mode 250 includes the passive adaptor listener 204, a Send Newly Generated Data process 254, and the data uploading flow 270. When new data 252 is generated, registered passive adapters 256 will automatically send the data to the passive adaptor listener 204 through the Send Newly Generated Data process 254. Once the passive adaptor listener 204 receives the new data, it is uploaded to the data storage component 150 through the data uploading flow 270 and the data storage component 150 stores the data in its sub-component, a raw data query node 280.

Figure 3:
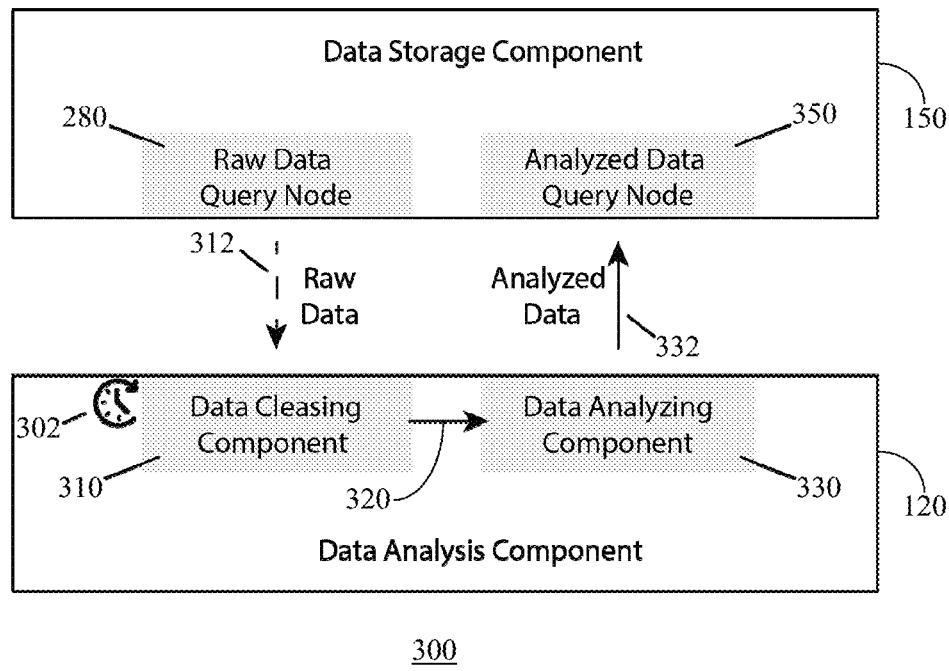
FIG. 3 depicts a schematic illustration of a data analysis procedure supported in the Data Analysis Component of the multi-source data management mechanism of FIG. 1 in accordance with the present embodiments.

The data analysis component 120 cleanses raw data and analyzes cleansed data for analyzed multi-source data. FIG. 3 depicts a schematic illustration 300 of a data analysis procedure supported in the data analysis component 120 in accordance with the present embodiments. The data analysis component 120 contains a timer 302 to trigger the data analysis process and two sub-components: a data cleansing component 310 which implements data cleansing procedures to remove dirty data and a data analyzing component 330 which implements data analysis procedures to generate useful information.

In operation, the timer 302 triggers the data analysis process by invoking the data cleansing component 310 to download raw data from the data query node 280 through a data downloading flow 312. The data cleansing component 310 runs data cleansing procedures to remove dirty data (e.g., records with abnormal values) from the raw data. The data cleansing component 310 then sends the cleansed data to the data analyzing component 330 for data analysis through a process 320. The data analyzing component 330 runs data analysis procedures to generate useful information. (e.g., classify weathers based on numerical values of environmental sensor data) from the cleansed data and then uploads the analyzed data to the data storage component 150 through an uploading data flow 332 and the data storage component 150 stores the data in an analyzed data query node 350 of the data storage component 150.

Figure 4:
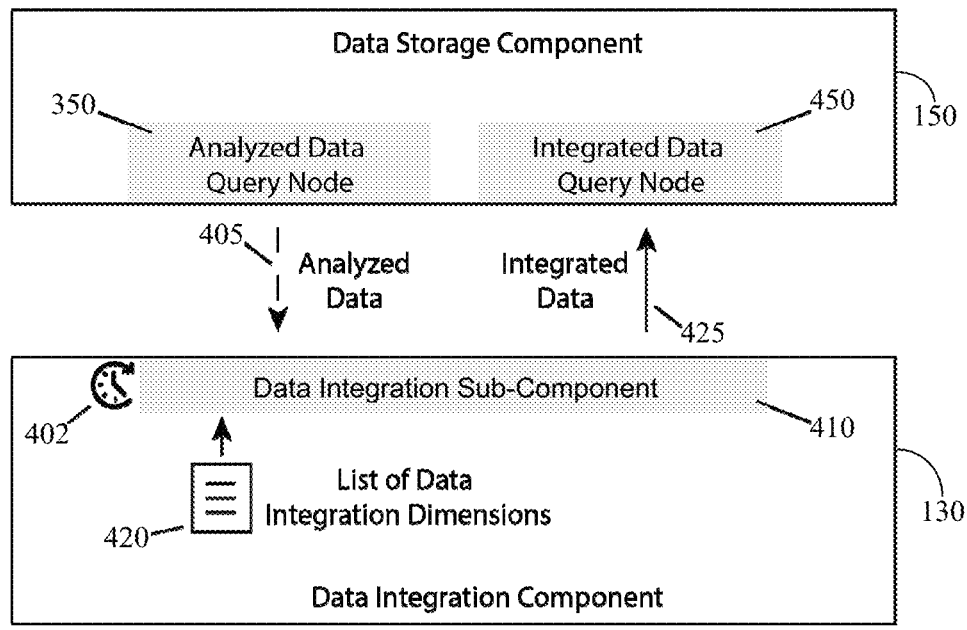
FIG. 4 depicts a schematic illustration of a data integration procedure designed in the Data Integration Component of the multi-source data management mechanism of FIG. 1 in accordance with the present embodiments.

Referring to FIG. 4, a schematic illustration 400 depicts a data integration procedure designed in the data integration component 130 in accordance with the present embodiments. The data integration component 130 consolidates and integrates multi-source data for a consistent and unified data network. The data integration component 130 contains a timer 402 to start the integration process and a data integrating sub-component 410 to generate data integration dimensions predefined in a list of data integration dimensions 420; three commonly used dimensions are time, place and people dimensions, which can be altered according to the actual need of an application domain.

The timer 402 starts the running of the data integrating sub-component 410. The data integrating sub-component 410 downloads analyzed data from the analyzed data query node 350 through the data downloading flow 405. The data integrating sub-component 410 runs data integration dimension generation processes according to the list of data integration dimensions 420. Then the data integrating sub-component 410 uploads generated integrated data to the data storage component 150 through an uploading data flow 425, and the data integrating sub-component 410 stores the data in an integrated data query node 450 of the data storage component 150.

Figure 5:
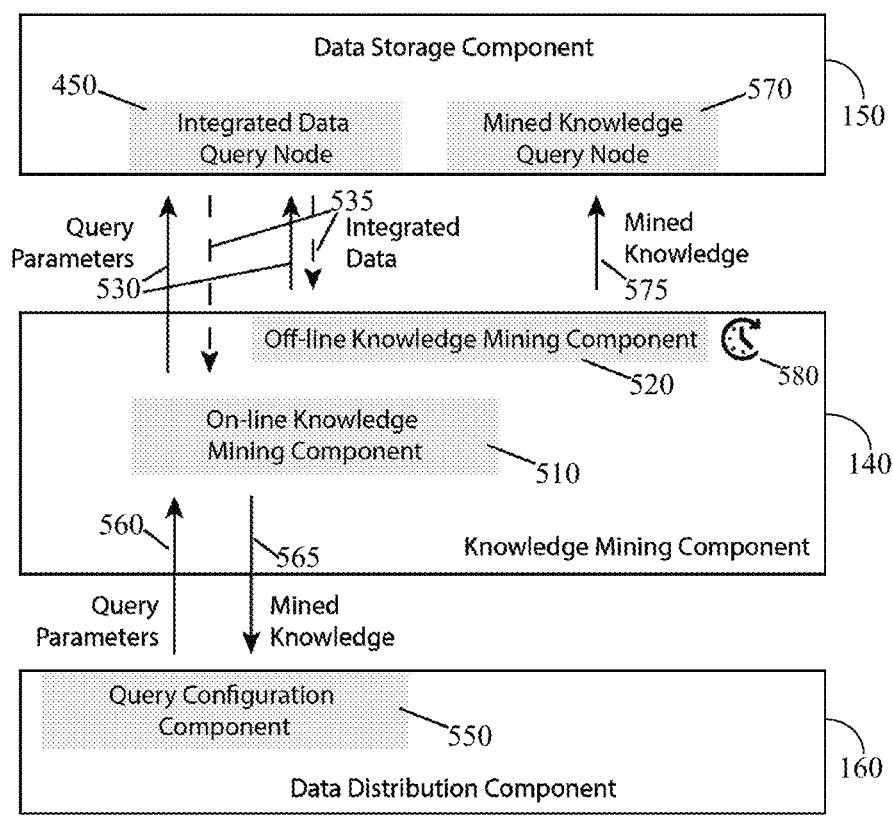
FIG. 5 depicts a schematic illustration of knowledge mining approaches supported in the Knowledge Mining Component of the multi-source data management mechanism of FIG. 1 in accordance with the present embodiments.

FIG. 5 depicts a schematic illustration 500 of knowledge mining approaches supported in the knowledge mining component 140 in accordance with the present embodiments. The knowledge mining component 140 mines knowledge from integrated data and has two sub-components: an on-line knowledge mining component 510 to run a multi-dimensional query on integrated data for real-time knowledge and an off-line knowledge mining component 520 to run delicate knowledge mining procedures on integrated data for deeper knowledge (e.g., human behavior patterns).

Workflow for on-line knowledge mining includes the integrated data query node 450 of the data storage component 150, data uploading flows 530 with query parameters, data downloading flows 535 with queried integrated data, the on-line knowledge mining component 510, a query configuration component 550 of the data distribution component 160, and two data flows: a first data flow 560 with configured query parameters and a second data flow 565 with mined knowledge. The query configuration component 550 configures query parameters and passes them to the on-line knowledge mining component 510 through the data uploading flow 560. When the on-line knowledge mining component 510 receives the query parameters, it passes related query parameters to the integrated data query node 450 through the data uploading flow 530, and downloads queried integrated data from the integrated data query node 450 through the data downloading flow 535. The on-line knowledge mining component 510 then runs a query on integrated data and generates query results. Then the on-line knowledge mining component 510 returns the query results as mined knowledge to the query configuration component 550 through the data uploading flow 565.

Workflow for off-line knowledge generation includes the integrated data query node 450 and a mined knowledge query node 570 of the data storage component 150, the data uploading flow 530 with query parameters, the data downloading flow 535 with queried integrated data, a data uploading flow 575, the off-line knowledge mining component 520, and a timer 580 in the knowledge mining component 140 as a trigger to start the off-line knowledge generation workflow. When the timer 580 triggers the off-line knowledge generation workflow, the off-line knowledge mining component 520 sends query parameters to the integrated data query node 450 through the data uploading flow 530 and, thereafter, downloads integrated data from the integrated data query node 450 through the data downloading flow 535. The off-line knowledge mining component 520 runs registered data mining procedures and generates related knowledge, then uploads the generated knowledge to mined knowledge query node 570 through the data uploading flow 575.

Figure 6:
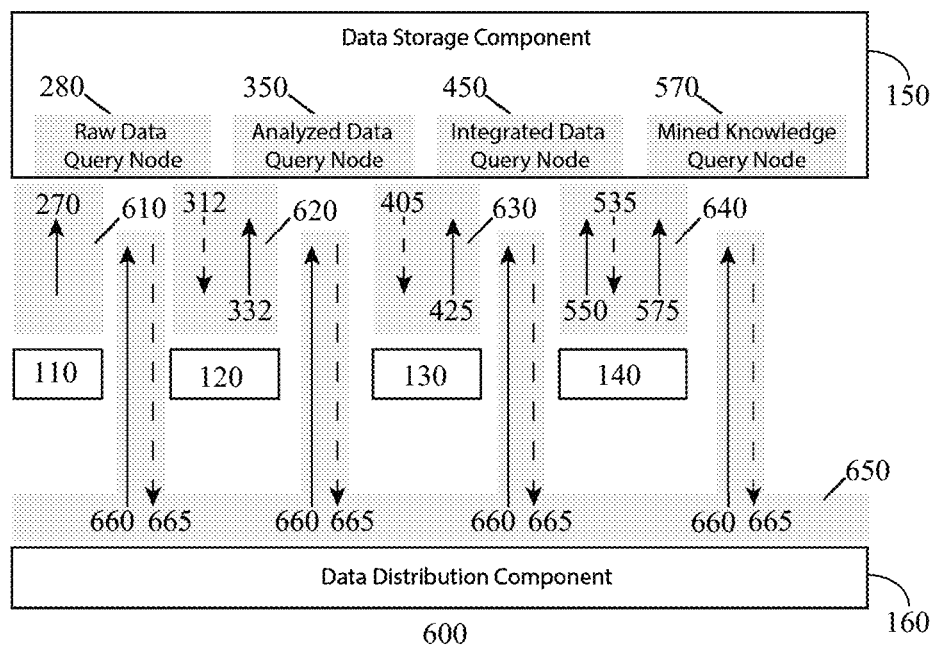
FIG. 6 depicts a schematic illustration of data flows supported by the Data Storage Component of the multi-source data management mechanism of FIG. 1 in accordance with the present embodiments.

FIG. 6 depicts a schematic illustration 600 of data flows supported by the data storage component 150 in accordance with the present embodiments. The data storage component 150 supports data CRUD operations and stores four kinds of data (i.e., four differently processed states of the multi-source data) in four kinds of data query nodes: the raw data query node 280, the analyzed data query node 350, the integrated data query node 450 and the mined knowledge query node 570.

The data storage component 150 also supports five groups of data flow. A first data flow group 610 couples data between the data collection component 110 and the raw data query node 280 and includes the data uploading flow 270. The first data flow group 610 is the raw data uploading process and the data uploading flow 270 is supported by the RESTful APIs of the raw data query node 280 through the POST method. RESTful APIs or Representational State Transfer APIs are application program interfaces (APIs) that use HTTP requests to GET, PUT, POST and DELETE data.

A second data flow group 620 couples data between the data analysis component 120 and the analyzed data query node 330 and includes the data downloading flow 312 and the data uploading flow 332. The second data flow group 620 is the data analysis data flow from raw data downloading to analyzed data uploading. The data downloading flow 312 is supported by the RESTful APIs of the analyzed data query node 350 through the GET method, and the data uploading flow 332 is supported by the RESTful APIs of the analyzed data query node 350 through the POST method.

A third data flow group 630 couples data between the data integration component 130 and the integrated data query node 450 and includes the data downloading flow 405 and the data uploading flow 425. The third data flow group 630 is the data integration data flow from the analyzed data downloading to the integrated data uploading. The data downloading flow 405 is supported by the RESTful APIs of the integrated data query node 450 through the GET method, and the data uploading flow 425 is supported by the RESTful APIs of the integrated data query node 450 through the POST method.

A fourth data flow group 640 couples data between the knowledge mining component 140 and the mined knowledge query node 450 and includes two data uploading flow 530, 575 and one data downloading flow 535. The fourth data flow group 640 is the knowledge mining data flow. The uploading data flow 530 is the query parameters uploading flow, which is supported by the RESTful APIs of the integrated data query node 450 through the GET method, and the data downloading flow 535 is the integrated data downloading flow, which is the response data flow of the query parameters uploading flow 530 with retrieved integrated data. The data uploading flow 575 is the mined knowledge uploading flow which is supported by the RESTful APIs of mined knowledge query node 570 through the POST method.

The fifth data flow group 650 couples data between the data distribution component 160 and the raw data query node 280, the analyzed data query node 350, the integrated data query node 450 and the mined knowledge query node 570. The fifth data flow group 650 includes the data uploading flows 660 and the data downloading flows 665. The fifth data flow group 650 is the data query flows in which data distribution component 160 retrieves required data from the raw data query node 280, the analyzed data query node 350, the integrated data query node 450 or the mined knowledge query node 570. The data uploading flows 660 as the request flows and the data downloading flows 665 as the response flows are supported by RESTful APIs of the raw data query node 280, the analyzed data query node 350, the integrated data query node 450 or the mined knowledge query node 570 through the GET method.

Figure 7:
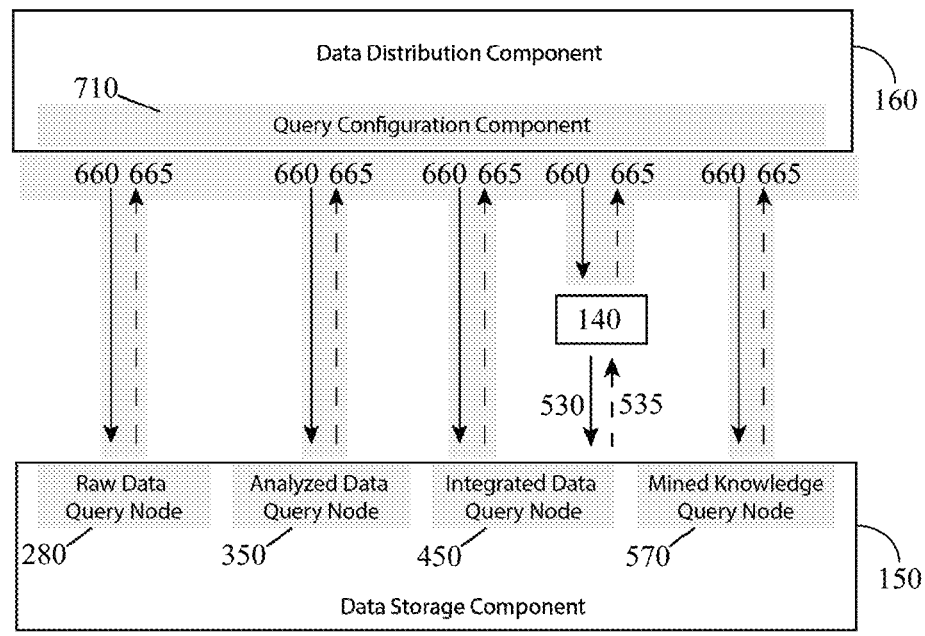
FIG. 7 depicts a schematic illustration of a data distribution procedure design in the Data Distribution Component of the multi-source data management mechanism of FIG. 1 in accordance with the present embodiments.

Referring to FIG. 7, a schematic illustration 700 depicts a data distribution procedure design in the data distribution component 160 in accordance with the present embodiments. The data distribution component 160 acts as a data facade to share multi-source data from raw data, analyzed data, integrated data, to mined knowledge. A query configuration component 710 is a sub-component of the data distribution component 160 which configures query parameters, such as specifying a data query node from the raw data query node 280, the analyzed data query node 350, the integrated data query node 450 or the mined knowledge query node 570, and other query parameters. The data distribution component 160 also passes the configured query parameters to the selected data query node through the data uploading flow 660. The selected query node queries the data and returns the retrieved data to the query configuration component 710 through the data downloading flow 665.

When a multi-dimensional query is generated in the query configuration component 710, the request is routed to the on-line knowledge mining component 510 of the knowledge mining component 140. The query configuration component 710 configures the parameters of the multi-dimensional query and passes the query parameters to the on-line knowledge mining component 510 through the data uploading flow 660, which will run the multi-dimensional query on the integrated data supported by the two data flows 530, 535. The on-line knowledge mining component 510 then returns the mined knowledge to query configuration component 710 through the data downloading flow 665.

Figure 8:
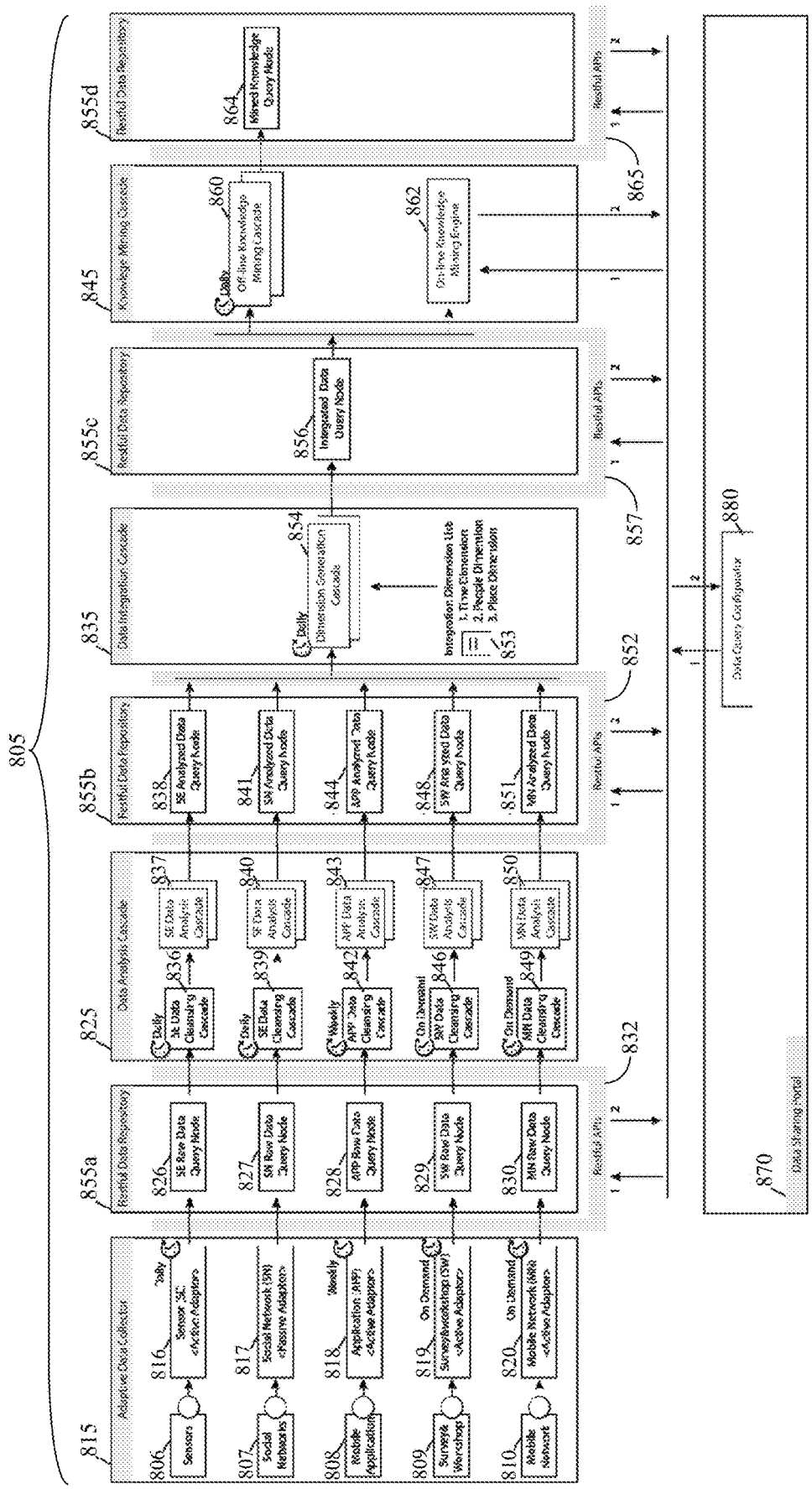
FIG. 8 depicts a block diagram of workflow and architecture of a multi-source data management platform implementing the multi-source data management mechanism of FIG. 1 in accordance with the present embodiments.

FIG. 8 depicts a block diagram 800 of workflow and architecture of a multi-source data management platform 805 implementing the multi-source data management mechanism 105 accordance with the present embodiments. In accordance with one exemplary embodiment of the multi-source data management mechanism 105, the multi-source data management platform 805 manages data from sensors (SE) 806, social networks (SN) 807 (e.g., Twitter, Instagram), a mobile application (APP) 808 (e.g., a people sensing application), surveys & workshops (SW) 809 (e.g., digital documents) and a mobile network (MN) 810. The multi-source data management platform 805 may manage data from other data sources which are required to provide data in an application domain. As final products of the platform, raw multi-source data is collected and stored, analyzed multi-source data is generated and stored, integrated multi-source data forming an interlinked data network is created based on predefined integration dimensions (in multi-source data management platform 805, the predefined integration dimensions include three commonly used data integration dimensions, namely time, place and people), and mined knowledge about place utilization to reveal place design contexts is generated and stored.

The multi-source data management platform 805 includes an adaptive data collector 815, a data analysis cascade 825, a data integration cascade 835, a knowledge mining cascade 845, a RESTful data repository 855, and a data sharing portal 870. These six elements of the platform 805 correspond to the data collection component 110, the data analysis component 120, the data integration component 130, the knowledge mining component 140, the data storage component 150, and the data distribution component 160, respectively, of the multi-source data management mechanism 105 (FIG. 1).

The adaptive data collector is an embodiment of the data collection component 110 and implements four active adaptors and one passive adaptor. The four active adaptors include a sensor active adaptor 816, an application active adaptor 818, a survey & workshop active adaptor 819, and a mobile network active adaptor 820. The active adaptors respectively collect data from the sensors 806 daily, the mobile application 808 weekly, the survey & workshop 809 on-demand, and the mobile network 810 on-demand. The passive adaptor is a social network passive adaptor 820 which collects data from the social networks 807 in real-time data streams. After multi-source data is collected from the five sources 806, 807, 808, 809, 810, the data is stored to related raw data query nodes 826, 827, 828, 829, 830 by using RESTful APIs 832 provided by the RESTful data repository 855a.

The data analysis cascade 825 is an embodiment of the data analysis component 120 (FIG. 1) and implements five groups of concurrent data analysis cascades. The first group of data analysis cascades 836, 837 analyzes sensor data with a daily execution frequency, where the data analysis cascade 836 is a sensor data cleansing cascade to remove dirty data and produce good quality data. The data analysis cascade 837 includes more than one sensor data analysis cascade and, after receiving the cleansed data from the data analysis cascade 836, all analysis cascades in the data analysis cascade 837 produce analyzed data. After the analyzed data is generated, it is stored to a sensor analyzed data query node 838 of the RESTful data repository 855b by using its RESTful APIs 852.

The second group of data analysis cascades 839, 840 analyzes social network data with a daily execution frequency, where the data analysis cascade 839 is a social network data cleansing cascade to remove dirty data and produce good quality data. The data analysis cascade 840 includes more than one social network data analysis cascade and, after receiving the cleansed data from the data analysis cascade 839, all analysis cascades in the data analysis cascade 840 produce analyzed data. After the analyzed data is generated, it is stored to a social network analyzed data query node 841 of the RESTful data repository 855b by using its RESTful APIs 852.

The third group of data analysis cascades 842, 843 analyzes application data with a weekly execution frequency, where the data analysis cascade 842 is an application data cleansing cascade to remove dirty data and produce good quality data. The data analysis cascade 843 includes more than one application data analysis cascade and, after receiving the cleansed data from the data analysis cascade 842, all analysis cascades in the data analysis cascade 843 produce analyzed data. After the analyzed data is generated, it is stored to an application analyzed data query node 844 of the RESTful data repository 855b by using its RESTful APIs 852.

The fourth group of data analysis cascades 846, 847 analyzes survey and workshop data with an on-demand execution frequency, where the data analysis cascade 846 is a survey and workshop data cleansing cascade to remove dirty data and produce good quality data. The data analysis cascade 847 includes more than one survey and workshop data analysis cascade and, after receiving the cleansed data from the data analysis cascade 846, all analysis cascades in the data analysis cascade 847 produce analyzed data. After the analyzed data is generated, it is stored to a survey and workshop analyzed data query node 848 of the RESTful data repository 855b by using its RESTful APIs 852.

The fifth group of data analysis cascades 849, 850 analyzes mobile network data with an on-demand execution frequency, where the data analysis cascade 849 is a mobile network data cleansing cascade to remove dirty data and produce good quality data. The data analysis cascade 850 includes more than one mobile network data analysis cascade and, after receiving the cleansed data from the data analysis cascade 849, all analysis cascades in the data analysis cascade 850 produce analyzed data. After the analyzed data is generated, it is stored to a mobile network analyzed data query node 851 of the RESTful data repository 855b by using its RESTful APIs 852.

The data integration cascade 835 is an embodiment of the data integration component 130 and according to the integration dimension list 853, three data integration dimensions, namely time dimension, people dimension and place dimension, are used by this platform to link multi-source data. Thus, a group of dimension generation cascades 854 which can be executed in parallel to generate defined dimension information per record retrieved from five analyzed data query nodes 838, 841, 844, 848, 851 runs daily to integrate multi-source data and store them to an integrated data query node 854 of the RESTful data repository 855*c* by using its RESTful APIs 857.

The knowledge mining cascade 845 is an embodiment of the knowledge mining component 140 (FIG. 1) and includes an off-line knowledge mining cascade 862 and an on-line knowledge mining engine 864. The off-line knowledge mining cascade 862 includes a group of concurrent knowledge mining cascades which run daily to mine knowledge from integrated data. The on-line knowledge mining engine 864 is a knowledge extraction engine which runs multidimensional queries (i.e., a kind of query applicable on integrated data to extract knowledge meeting specified dimension attribute values) and it is used by 870 data sharing portal to generate required knowledge in real-time.

The restful data repository 855 with the sub-components 855*a*, 855*b*, 855*c*, 855*d* is an embodiment of the data storage component 150 and stores four kinds of data, namely raw multi-source data, analyzed multi-source data, integrated multi-source data, and mined knowledge in the raw data query nodes 826, 827, 828, 829, 830, the analyzed data query nodes 838, 841, 844, 848, 851, the integrated data query node 856 and a mined knowledge query node 864 of the RESTful data repository 855*d* which stores the mined knowledge using its RESTful APIs 865. Each query node contains more than one data collection to store related raw data, analyzed data, integrated data and mined knowledge. For example, in the integrated data query node 856, integrated data is grouped according to various analysis measures which are predefined and, accordingly, integrated data related to an analysis measure are stored in a data collection. Similarly, in the mined knowledge query node 864, mined knowledge is grouped according to various aspects and, therefore, knowledge related to an aspect is stored in a data collection.

The data sharing portal 870 is an embodiment of the data distribution component 160 and distributes data and knowledge managed by the platform 805 to end users and up-layer applications using a data query configurator 880. Specifically, the data sharing portal 870 shares four kinds of data stored in the raw data query nodes 826, 827, 828, 829, 830, the analyzed data query nodes 838, 841, 844, 848, 851, the integrated data query node 856 and the mined knowledge query node 864. In addition, the data sharing portal 870 also shares knowledge generated by the on-line knowledge mining engine 862.

Figure 9A:
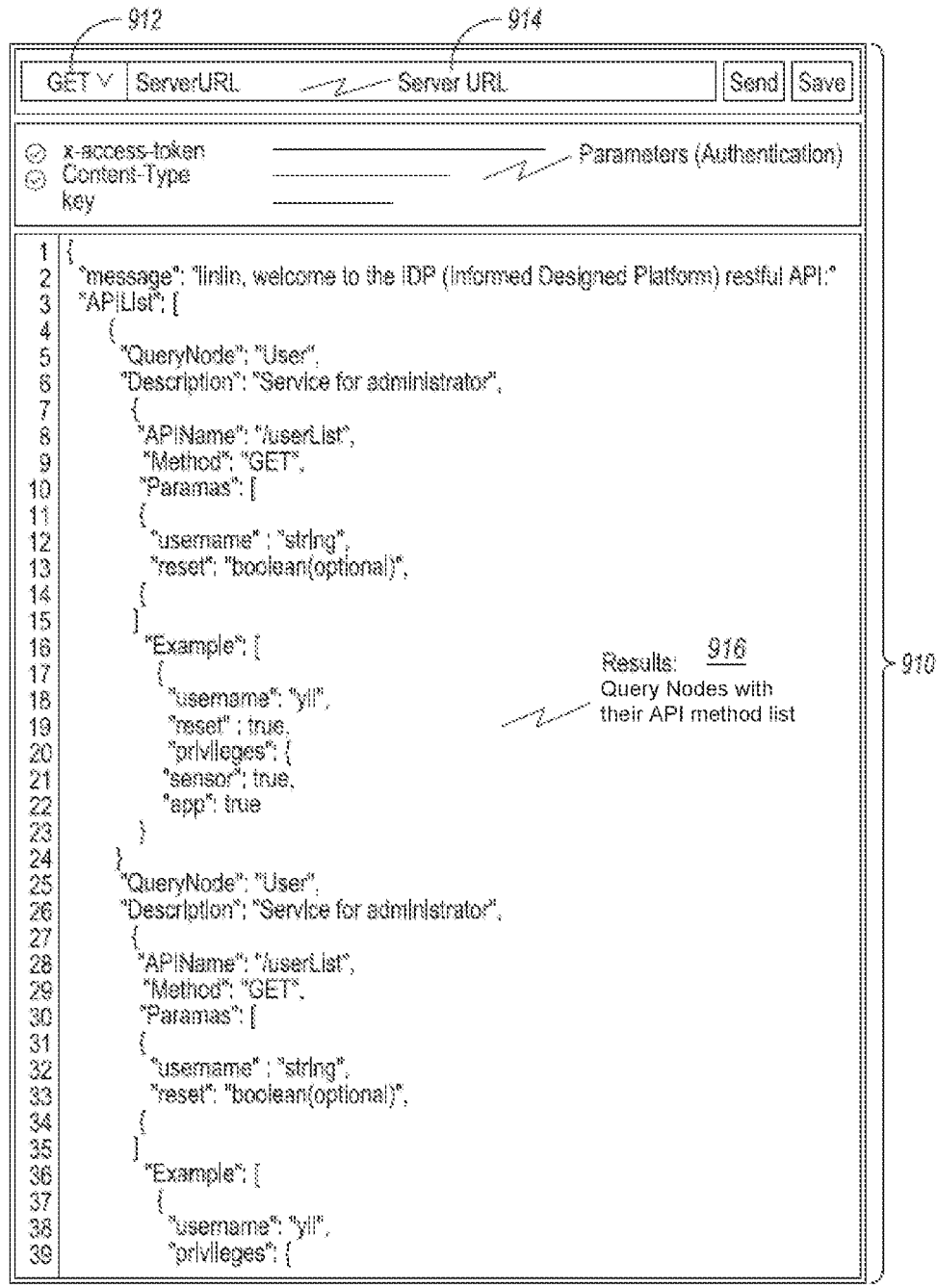
Figure 9B:
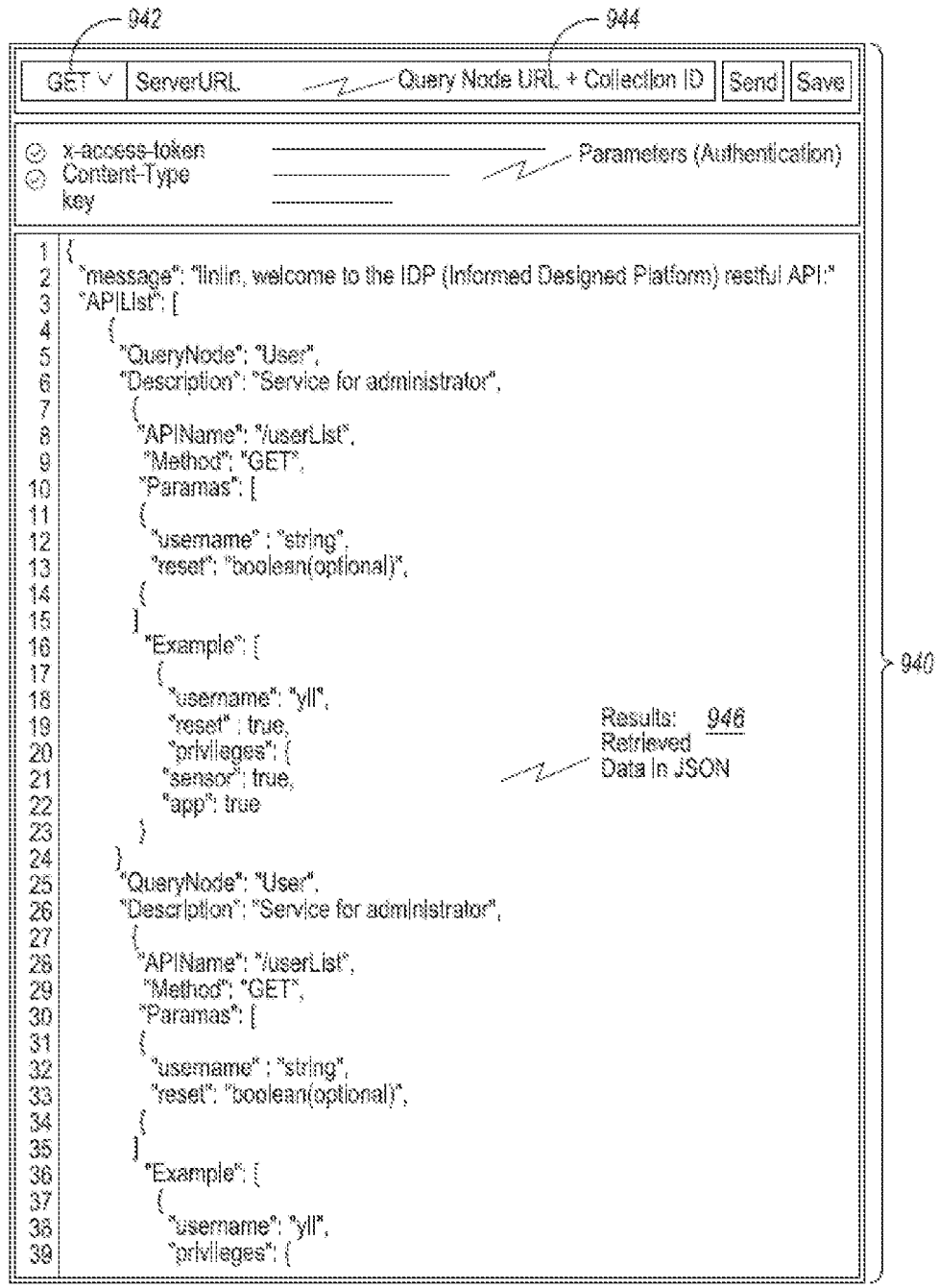

FIGS. 9A, 9B and 9C depict illustrations 900, 930, 960 of exemplary user interfaces 910, 940, 970 of the data sharing portal 870 in accordance with the present embodiments for end users to access data managed by the platform. Referring to the user interface 910, a user can use the user interface 910 to retrieve a full list of query nodes and their supported API methods from the platform 805 through the data sharing portal 870. To retrieve a full list of query nodes and their supported API methods, the user needs to set the request 912 to GET and set the server URL 914 to the server where the data sharing portal 870 runs. Next, the user needs configure the GET request header which needs to include a validated service access token. After sending the GET request, the results of the query are received and displayed in the result area 916.

Referring to the user interface 940, a user can use the user interface 940 to retrieve a data in a collection of a given query node from the platform 805 through the data sharing portal 870. To retrieve the data in a collection of a given query node, the user needs to set the request 942 to GET and set the query URL with the server URL to an available query node URL and an available data collection ID 944. An example of a query URL in accordance with the query node URL and collection ID 944 is: http(s)://serverURL/querynode/collectionID. Next, the user needs configure the GET request header which needs to include a validated service access token. After sending the GET request, the results of the query are received and displayed in the result area 946.

Referring to the user interface 970, a user can use the user interface 970 to retrieve data in a collection of a given query node from the platform 805 through the data sharing portal 870 by executing a defined query. To retrieve the data in a collection of a given query node by executing a defined query, the user needs to set the request 972 to POST and set the query URL with the server URL to an available query node URL and a query API method 974. An example of a query URL in accordance with the query node URL and query method 974 is: http(s)://serverURL/querynode/query. Next, the user needs set the query parameters in JSON, which must have a validated service access token, an available data collection ID in the specified query node, and a query statement. After sending the POST request, the results of the query are received and displayed in the result area 976.

Figure 10:
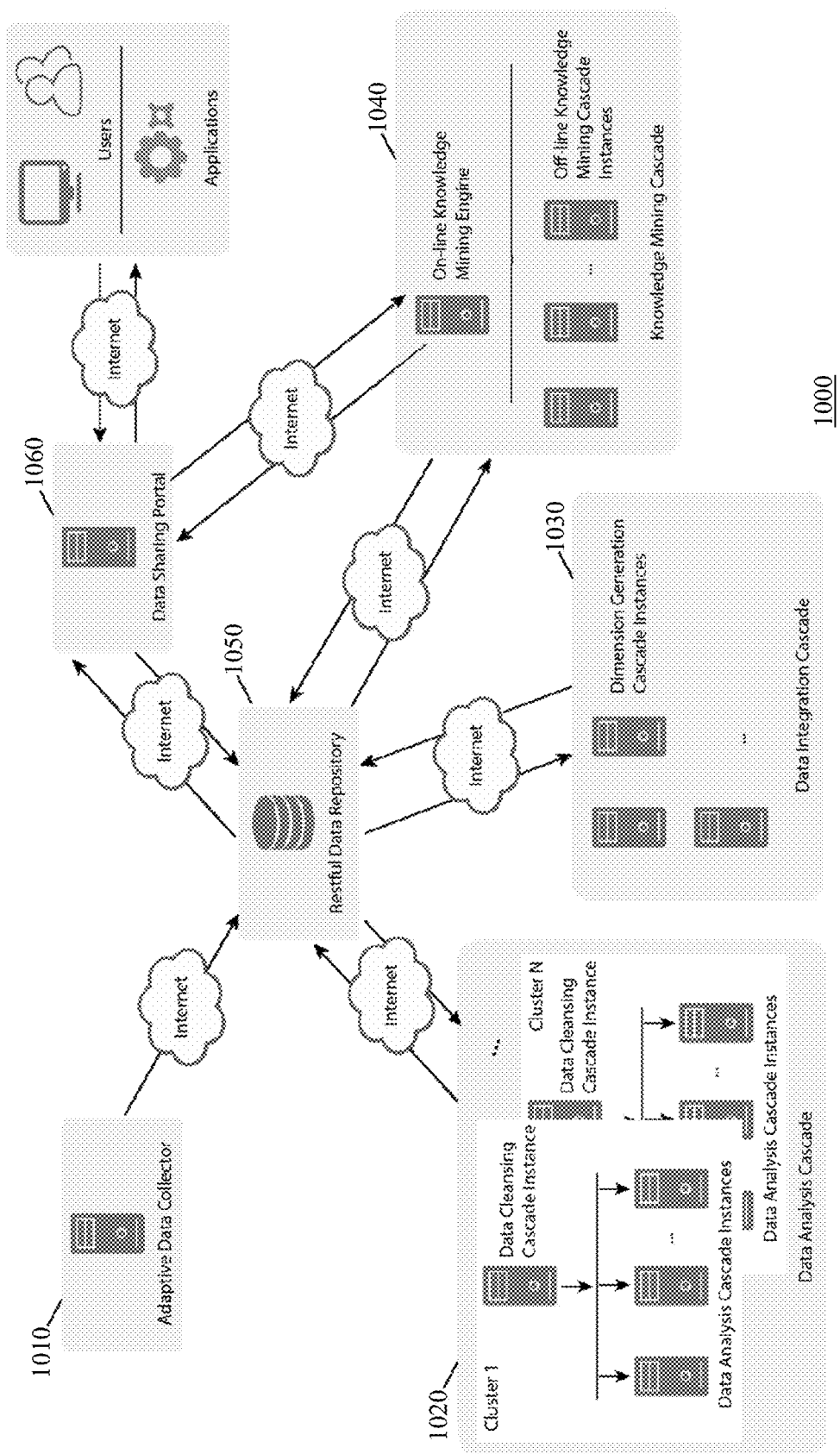
FIG. 10 depicts an illustration of a platform deployment diagram of the multi-source data management platform of FIG. 8 in a distributed computing environment in accordance with the present embodiments.

Referring to FIG. 10, a platform deployment diagram 1000 of the multi-source data management platform 805 in a distributed computing environment in accordance with the present embodiments is depicted. The platform 805 runs in a distributed environment to achieve an optimized performance in processing big volume data. In general, the platform is highly scalable, as all the components can be extended when more computation power is needed.

When data from new sources is to be collected, related new adaptors in either active mode or passive mode can be implemented and added to the adaptive data collector without making any changes or influences on existing adaptors.

The data analysis cascade 1020 includes several computation clusters to cleanse and analyze multi-source data. In general, data from one source is managed by a cluster with a data cleansing cascade instance and several data analysis cascade instances. However, if the computation is heavy due to large data volumes or data analysis complexity is high, more than one cluster can be deployed to process data concurrently.

Due to the concise design of this component, the data integration cascade 1030 deploys more than one dimension generation cascade instance to speed up the data integration process. In general, the number of the instances depends on the requirements of performance of the platform.

The knowledge mining cascade 1040 ensures the scalability by the separated deployment of off-line knowledge mining cascade instances. In this approach, all the data mining procedures can run in parallel and detailed optimization in data processing can also be applied, such as using map-reduce mechanisms.

The RESTful data repository 1050 manages all the data generated in the platform. The storage capability can be dynamically extended by using distributed file systems or data management systems, such as Hadoop or MongoDB.

And the data sharing portal 1060 works as a common web application. In case, it needs to process numerical data access requests from end users and up-layer applications, the data sharing portal 1060 can be deployed in more than one server and a load balancing mechanism can be applied.

Thus, it can be seen that the present embodiments provide a multi-source data management mechanism to efficiently and effectively collect, analyze, integrate, mine, store and share data generated from multiple objects. In accordance with present embodiments, a multi-source data management mechanism and a platform implementing the mechanism to manage multi-source data generated from sensors, mobile applications, surveys and workshops, social networks and mobile networks. The multi-source data management platform includes an adaptive data collector to collect data from multiple sources actively and passively; a data analysis cascade to cleanse and analyse multi-source data concurrently and separately; a data integration cascade to consolidate and integrate multi-source data according to place, people and time data integration dimensions comprehensively; a knowledge mining engine to support multi-dimensional queries for on-line knowledge mining, and to run delicate knowledge mining procedures for off-line knowledge mining; a centralized data repository implementing RESTful APIs for data CRUD operations and storing multi-source data generated in the platform; and finally a data sharing portal to share data and mined knowledge to users and up-layer applications.

While exemplary embodiments have been presented in the foregoing detailed description of the present embodiments, it should be appreciated that a vast number of variations exist. It should further be appreciated that the exemplary embodiments are only examples, and are not intended to limit the scope, applicability, operation, or configuration of the invention in any way. Rather, the foregoing detailed description will provide those skilled in the art with a convenient road map for implementing exemplary embodiments of the invention, it being understood that various changes may be made in the function and arrangement of steps and method of operation described in the exemplary embodiments without departing from the scope of the invention as set forth in the appended claims.

What is claimed is:

1. A multi-source data management platform comprising:
    a knowledge mining engine comprising an on-line knowledge mining component supporting multi-dimensional queries for on-line knowledge mining of multi-source data and an off-line knowledge mining component for running knowledge mining procedures for off-line knowledge mining of the multi-source data;
    a data integration cascade consolidating and comprehensively integrating the multi-source data according to dimensions of the multi-dimensional queries, the data integration cascade coupled to the knowledge mining engine for providing the integrated multi-source data thereto:
    an adaptive data collector to actively and passively collect the multi-source data from multiple sources; and
    a data analysis cascade coupled to the adaptive data collector to cleanse and analyse the multi-source data concurrently and separately, the data analysis cascade coupled to the data integration cascade to provide the cleansed multi-source data thereto.

2. The multi-source data management platform in accordance with Claim 1 wherein the dimensions are three or more dimensions.

3. The multi-source data management platform in accordance with claim 2 wherein the three or more dimensions comprise dimensions of place, people and time.

4. The multi-source data management platform in accordance with Claim 1 wherein the multi-source data comprises data from two or more sources providing data required in an application domain, the data selected from the group comprising sensors, mobile applications, surveys and workshops, social networks, and mobile networks.

5. The multi-source data management platform in accordance with claim 1 further comprising a centralized data repository coupled to the knowledge mining engine and storing the multi-source data generated in the multi-source data management platform, including knowledge mined multi-source data on-line and/or off-line mined by the knowledge mining engine.

6. The multi-source data management platform in accordance with claim 5 wherein the centralized data repository implements Representational State Transfer (RESTful) APIs for data create, read, update and delete (CRUD) operations.

7. The A multi-source data management platform in accordance with claim 5 comprising:
    a knowledge mining engine comprising an on-line knowledge mining component supporting multi-dimensional queries for on-line knowledge mining of multi-source data and an off-line knowledge mining component for running knowledge mining procedures for off-line knowledge mining of the multi-source data; and
    a centralized data repository coupled to the knowledge mining engine and storing the multi-source data generated in the multi-source data management platform, including knowledge mined multi-source data on-line and/or off-line mined by the knowledge mining engine, wherein the centralized data repository comprises at least four data query nodes, each of the four data query nodes storing a differently processed state of the multi-source data.

8. The multi-source data management platform in accordance with claim 7 wherein the differently processed states of the multi-source data comprise raw data, analyzed data, integrated data and mined knowledge, the mined knowledge mined by the knowledge mining engine from the multi-source data.

9. The multi-source data management platform in accordance with claim 7 wherein the centralized data repository implements Representational State Transfer (RESTful) APIs for data create, read, update and delete (CRUD) operations.

10. The multi-source data management platform in accordance with claim 1 further comprising a data sharing portal coupled to the knowledge mining engine for sharing mined knowledge mined by the knowledge mining engine from the multi-source data to users and/or up-layer applications.

11. The multi-source data management platform in accordance with claim 10 wherein the data sharing portal further shares additional differently processed states of the multi-source data to users and/or up-layer applications.

12. The multi-source data management platform in accordance with claim 11 wherein the additional differently processed states of the multi-source data comprise one or more of raw data, analyzed data and integrated data.

13. A method for multi-source data management comprising:
    collecting data from multiple sources;
    cleansing and analysing the multi-source data concurrently and separately;
    integrating the multi-source data according to multiple integration dimensions to obtain integrated multi-source data;
    on-line knowledge mining of multi-dimensional queries applied to the integrated multi-source data to obtain knowledge mined data;
    off-line knowledge mining of the multi-dimensional queries applied to the integrated multi-source data to obtain additional knowledge mined data; and
    storing the multi-source data, including the integrate multi-source data, and the knowledge mined data.

14. The method of claim 13 further comprising sharing the multi-source data and the knowledge mined data.

15. The method of claim 14 wherein sharing the multi-source data and the knowledge mined data comprises sharing the source data and the knowledge mined data to users and/or up-layer applications.

16. The method of claim 13 wherein collecting data from multiple sources comprises collecting data from multiple sources both actively and passively.

17. The method of claim 13 wherein integrating the multi-source data according to multiple integration dimensions comprises integrating the multi-source data according to predefined integration dimensions.

18. The method of claim 17 wherein integrating the multi-source data according to predefined integration dimensions comprises integrating the multi-source data according to a place dimension, a people dimension and a time dimension.

19. The method of claim 13 wherein the off-line mining further comprises implementing RESTful APIs for data CRUD operations for the multi-source data.

* * * * *